(12) United States Patent
Zhang et al.

(10) Patent No.: US 12,019,181 B2
(45) Date of Patent: Jun. 25, 2024

(54) ITERATIVE FOCUSED MILLIMETER WAVE INTEGRATED COMMUNICATION AND SENSING METHOD

(71) Applicant: ZHEJIANG UNIVERSITY, Zhejiang (CN)

(72) Inventors: Zhaoyang Zhang, Hangzhou (CN); Xin Tong, Hangzhou (CN); Yihan Zhang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/358,975

(22) Filed: Jul. 26, 2023

(65) Prior Publication Data

US 2024/0045026 A1 Feb. 8, 2024

Related U.S. Application Data

(63) Continuation of application No. PCT/CN2022/138958, filed on Dec. 14, 2022.

(30) Foreign Application Priority Data

Jul. 29, 2022 (CN) .......................... 202210906702.0

(51) Int. Cl.
*G01S 7/00* (2006.01)
*G01S 7/41* (2006.01)
*H04W 64/00* (2009.01)

(52) U.S. Cl.
CPC .............. *G01S 7/414* (2013.01); *G01S 7/006* (2013.01); *H04W 64/00* (2013.01)

(58) Field of Classification Search
CPC ......... G01S 7/414; G01S 7/006; H04W 64/00
See application file for complete search history.

(56) References Cited

U.S. PATENT DOCUMENTS

2020/0356086 A1 11/2020 Mirfakhraei et al.
2022/0250328 A1* 8/2022 Buller .................... B22F 10/38

FOREIGN PATENT DOCUMENTS

| CN | 111107023 A | 5/2020 |
| CN | 113965881 A | 1/2022 |
| CN | 115243311 A | 10/2022 |

OTHER PUBLICATIONS

International Search Report (PCT/CN2022/138958); Date of Mailing: Feb. 21, 2023.
Rigid-Body-Localization-and-Environment-Sensing-with-5G-Millimeter-Wave-MIMO.

* cited by examiner

*Primary Examiner* — Timothy A Brainard
(74) *Attorney, Agent, or Firm* — W&G Law Group

(57) ABSTRACT

Provided is an iterative focused millimeter wave integrated communication and sensing method, which converts an environmental sensing problem into a compressed sensing reconstruction problem, and realizes the initial coarse sensing of the environment based on an approximate message passing algorithm; according to a background determining method, the present disclosure divides and determines a target object, removes the influence of background scatters on a receiving signal, and removes the background scatters repeatedly and iteratively, so as to obtain a more accurate focus sensing result of the target object. Compared with existing environment sensing reconstruction algorithms, the iterative focused millimeter wave environment sensing algorithm of the present disclosure significantly improves the accuracy of environment sensing, solves the problem that a large-scale environment cannot be accurately sensed due to limited system resources, and provides an efficient environment sensing method for the future design of integrated sensing and communication systems.

5 Claims, 2 Drawing Sheets

ITERATIVE FOCUSED MILLIMETER WAVE INTEGRATED COMMUNICATION AND SENSING METHOD

CROSS-REFERENCE TO RELATED APPLICATIONS

The present application is a continuation of International Application No. PCT/CN2022/138958, filed on Dec. 14, 2022, which claims priority to Chinese Application No. 202210906702.0, filed on Jul. 29, 2022, the contents of both of which are incorporated herein by reference in their entireties.

TECHNICAL FIELD

The present disclosure belongs to the technical field of wireless communication, and particularly relates to an iterative focused millimeter wave integrated communication and sensing method.

BACKGROUND

In the current wireless communication field, the emergence of innovative wireless communication technologies, such as ultra-large-scale multiple-input multiple-output (MIMO) technology, intelligent reflecting surface (IRS) and wireless artificial intelligence (AI), provides more possibilities for the design of future wireless communication systems. In the foreseeable future wireless communication present disclosure scenarios, technologies such as autonomous driving, intelligent robot navigation and unmanned aerial vehicle control need not only wireless broadband connection, but also accurate environmental information, including the position, shape and electromagnetic characteristics of objects in the environment. Therefore, as the research hotspot of the 6th generation (6G) wireless communication system, the integrated sensing and communication (ISAC) technology aims to realize environmental sensing by using wireless communication equipment and infrastructure.

In an uplink wireless communication scenario, users send communication signals to the base station for reception, and the transmitted signals are reflected and scattered by objects in the environment, such that the receiving signals of the base station contain environmental information. The design of the integrated system of sensing and communication has a great difficulty: how to deal with a large number of potential unknown variables in the environment, therefore the sparsity of the target environment itself shall be utilized. For example, in the urban wireless communication scene, buildings are sparsely distributed in the block. In addition, in the wireless communication application scenario, electromagnetic waves spread widely, and any environmental scatterer covered by wireless signals will affect the propagation of electromagnetic waves. However, the resources available for environmental sensing, such as the number of users, the number of base station receiving antennas and the number of subcarriers, are limited. Even taking advantage of the sparsity of environmental information, environmental sensing still faces the problem of large system resource expenditure caused by a large number of environmental information variables. At present, the existing integration method of millimeter wave communication and sensing does not take into account the influence of limited system resources on sensing algorithms. Under the condition of limited system resources, only a coarse sensing of the environment can be achieved, and fuzzy imaging results can be obtained. It is urgent to focus on specific targets with limited resources, so as to obtain accurate environmental sensing results. To sum up, how to use limited system resources to achieve accurate sensing of specific targets has high research difficulty and practical significance.

SUMMARY

In view of the shortcomings of the prior art, the object of the present disclosure is to realize environment sensing by a base station using uplink data sent by multiple users in an uplink wireless communication scenario. The present disclosure uses the pilot signal of the existing communication system or other known data sequences for sensing, and can be compatible with the existing communication system to realize the integration of sensing and communication. Considering that the system resources used for sensing are limited, it is impossible to sense all the environment in a large range, an iterative focused millimeter wave environment sensing method for specific targets is proposed.

The object of the present disclosure is achieved by the following technical solution:

Provided is an iterative focused millimeter wave integrated communication and sensing method. In an uplink wireless communication scenario, active users send communication signals to the base station for reception, and the sent signals are transmitted to the base station via multipath channel. The method includes the following steps:

S1, in any time slot, receiving, by a base station, pilot frequency sequence signals with a certain length sent by all active users in an environment to obtain receiving signals, wherein the receiving signals are signals after the pilot frequency sequence signals are influenced by the environment.

S2, converting an environmental sensing problem of a specific target into a compressed sensing reconstruction problem by using the receiving signals in the step S1 based on a multi-beam multi-carrier millimeter wave channel model.

S3, solving the compressed sensing reconstruction problem in step S2 based on an approximate message passing method to obtain a coarse initial result of environment sensing.

S4, selecting a predetermined region as a focused region of interest from the whole environment based on the coarse initial result of environmental sensing, and dividing and determining an target object in the region of interest according to a background determining method and removing the influence of background scatters outside the region of interest on the receiving signals to obtain receiving signals corresponding to the target object.

S5, calculating an environmental sensing result based on the receiving signals corresponding to the target object obtained in the step S4.

S6, repeating step S4 and step S5 in sequence until the algorithm convergence to obtain a final environment sensing result.

Further the step S2 specifically includes the following steps:

S21, discretizing environmental information in the receiving signals in step S1 into pixels; here, each pixel represents environmental information in a small square with a surrounding size of $l_s \times w_s$, and if an environmental size of a whole range is $L_s \times W_s$, a total number of the pixels is $N_s = L/l_s \times W/w_s$; an interior of each pixel may be empty, or there may be scatters; a scattering coefficient $x_{n_s}$ is used to represent the scattering coefficient of a small cube where a $n_s^{th}$ point cloud is located; if an interior of the small cube is empty, then $x_{n_s}$=0; therefore, the environmental information of a whole room can be expressed as $x=[x_1, x_2, \ldots, x_{N_s}]^T$.

S22, using a multi-beam multi-carrier millimeter wave channel model, wherein at an $n_f^{th}$ subcarrier frequency, the receiving signals received by a receiving antenna of the base station are expressed as follows:

$$y_{n_f} = w_{n_f}(H_{n_f}^{s \to B} \text{diag}(\delta x) H_{n_f}^{u \to s} + H_{n_f}^{LOS}) s_{n_f} + = w_{n_f}(H_{n_f}^{NLOS} + H_{n_f}^{LOS}) s_{n_f} + n$$

where $y_{n_f} \in \mathbb{C}^{N_c \times K}$ represents the receiving signals with a length of K code elements of RF links of $N_c$ base stations, $w_{n_f} \in \mathbb{C}^{N_c \times N_R}$ is a beam forming vector of $N_R$ uniform linear array receiving antennas of the base stations, $\delta$ is a normalized coefficient of a scattering coefficient, which is selected according to a pixel size $l_s \times w_s$ and describes the physical relationship between an electromagnetic wave receiving region and a receiving power $s_{n_f} \in \mathbb{C}^{N_u \times K}$ represents pilot frequencies with a length of K code elements sent by $N_u$ users, n is noise; $H_{n_f}^{LOS}$ represents a free-space propagation channel from $N_u$ users to $N_R$ receiving antennas at an $n_f^{th}$ subcarrier frequency; $H_{n_f}^{NLOS}$ is a Non-Line-of-Sight (NLOS) channel on a $n_f^{th}$ subcarrier;

$H_{n_f}^{LOS}$ is expressed as $$H_{n_f}^{LOS} = e_{n_f}^{LOS} G_{n_f}^{LOS}$$

where $e_{n_f}^{LOS}$ is a steering vector of $N_u$ users and $G_{n_f}^{LOS}$ is a channel gain from $N_u$ users to the base station;

$$e_{n_f}^{LOS}(n_R, n_u) = e^{j \frac{2\pi}{\lambda_{n_f}}(n_R-1)d \sin\theta_{n_u}^{LOS}} / \sqrt{N_R}$$

where j represents a complex code element, $n_R$ is a serial number of the receiving antenna, $\theta_{n_u}^{LOS}$ is an arrival angle of a $n_u^{th}$ user, and d is a uniform linear array antenna spacing deployed by the base station, $\lambda_{n_f}$ is a wavelength; $G_{n_f}^{LOS}$ is expressed as follows:

$$G_{n_f}^{LOS} = \text{diag}\left(\left[g_{n_f,1}^{LOS} e^{j\varphi_{n_f,1}^{LOS}}, \ldots, g_{n_f,N_u}^{LOS} e^{j\varphi_{n_f,N_u}^{LOS}}\right]\right)$$

where $g_{n_f u}^{n \ LOS}$ and $\varphi_{n_f u}^{n \ LOS}$ are a channel amplitude gain and a phase shift from the $n_u^{th}$ user to the base station, respectively.

At the $n_f^{th}$ subcarrier frequency, a free-space propagation channel $H_{n_f}^{u \to s}(n_s, n_u)$ from the $n_u^{th}$ user to a $n_s^{th}$ pixel is expressed as:

$$H_{n_f}^{u \to s}(n_s, n_u) = g_{n_f}^{u \to s}(n_s, n_u) e^{j\varphi_{n_f}^{u \to s}(n_s,n_u)}$$

where $g_{n_f}^{u \to s}(n_s, n_u)$ and $\varphi_{n_f}^{u \to s}(n_s, n_u)$ are a channel amplitude gain and a phase shift from $n_u^{th}$ user to the $n_s^{th}$ pixel, respectively.

At the $n_f^{th}$ subcarrier frequency, a free-space propagation channel $H_{n_f}^{s \to B} \in \mathbb{C}^{N_R \times N_s}$ from $N_s$ pixels to $N_R$ receiving antennas is expressed as:

$$H_{n_f}^{s \to B} = e_{n_f}^{s \to B} G_{n_f}^{s \to B}$$

where $e_{n_f}^{s \to B}$ is a steering vector of $N_s$ pixels and $G_{n_f}^{s \to B}$ is a channel gain from $N_s$ pixels to the base station;

$$e_{n_f}^{s \to B}(n_R, n_s) = e^{j \frac{2\pi}{\lambda_{n_f}}(n_R-1)d \sin\theta_{n_s}^{s \to B}} / \sqrt{N_R}$$

where $n_R$ is a receiving antenna number, $\theta_{n_s}^{s \to B}$ an arrival angle of the $n_s^{th}$ pixel, and $G_{n_f}^{s \to B}$ is expressed as follows:

$$G_{n_f}^{s \to B} = \text{diag}\left(\left[g_{n_f,1}^{s \to B} e^{j\varphi_{n_f,1}^{s \to B}}, \ldots, g_{n_f,N_s}^{s \to B} e^{j\varphi_{n_f,N_s}^{s \to B}}\right]\right)$$

where $g_{n_f s}^{n \ s \to b}$ and $\varphi_{n_f s}^{n \ s \to b}$ are a channel amplitude gain and a phase shift from the $n_s^{th}$ pixel to the base station, respectively.

S23, expressing an estimation result of the environmental information as $\hat{x}$, which is expressed as follows:

$$\hat{x} = \arg\min_{x_{ROI}} \|X\|_0 \ s.t. \|y - w(H^{NLOS} + H^{LOS})s\|_2 \leq \varepsilon$$

where y is a receiving signal of all subcarriers, w is a beam forming vector of the uniform linear array receiving antenna of all subcarriers, $x_{ROI}$ is environmental information in a region of interest, $H^{NLOS}$ is a NLOS channel of all subcarriers, $H^{LOS}$ is a LOS channel of all subcarriers, s is a transmitted signal of the NLOS channel of all subcarriers, and $\varepsilon$ is a relaxation variable.

Since a free-space channel coefficient of a direct-view channel can be estimated by a numerical model, at the $n_f^{th}$ subcarrier frequency, part of the receiving signal $\tilde{y}_{n_f}$ containing unknown environmental information is expressed as follows:

$$\tilde{y}_{n_f} = w_{n_f} H_{n_f}^{s \to B} \text{diag}(\delta x) H_{n_f}^{u \to s} s_{n_f} + n$$

By combining data of $N_f$ subcarriers, an iterative focused environmental sensing problem of a specific target is converted into a compressed sensing reconstruction problem equation as follows:

$$\begin{bmatrix} \tilde{y}_1(:,1) \\ \vdots \\ \tilde{y}_1(:,K) \\ \vdots \\ \tilde{y}_{N_f}(:,1) \\ \vdots \\ \tilde{y}_{N_f}(:,K) \end{bmatrix}_{N_c N_f K \times 1} = \delta \begin{bmatrix} w_1 H_1^{s \to B} \text{diag}(H_1^{u \to s} s_1(:,1)) \\ \vdots \\ w_1 H_1^{s \to B} \text{diag}(H_1^{u \to s} s_1(:,K)) \\ \vdots \\ w_{N_f} H_{N_f}^{s \to B} \text{diag}(H_{N_f}^{u \to s} s_{N_f}(:,1)) \\ \vdots \\ w_{N_f} H_{N_f}^{s \to B} \text{diag}(H_{N_f}^{u \to s} s_{N_f}(:,K)) \end{bmatrix}_{N_c N_f K \times N_s} [x]_{N_s \times 1} + n \Rightarrow \tilde{y} = Ax + n.$$

Further, the step S3 specifically includes the following steps:

S31, firstly setting an initial coarse environmental sensing prior probability, and letting the environmental information be a Bernoulli-Gaussian distribution, wherein a probability density function $p_x(x|q)$ is expressed as:

$$p_x(x|q) = (1-\lambda)\delta(x) + \lambda N(x|\theta^x, \sigma^x)$$

where x represents an element in the environmental information x, all parameters are expressed as $q \triangleq [\lambda, \theta^x, \sigma^x]$, $\delta(\cdot)$ is an impulse function, $\lambda$ is a sparse coefficient; $\theta^x \in [0,1]$ and $\sigma^x$ are a mean value and a variance of environmental information distribution, respectively, and $N(\cdot)$ represents a standard normal distribution;

S32, initializing approximate message passing algorithm parameters, and letting input functions $g_{in}(\cdot)$, $g'_{in}(\cdot)$ and output functions $g_{out}(\cdot)$, $g'_{out}(\cdot)$ be the following respectively $$g_{in}(\hat{v}, \sigma^v, q) = \mathrm{argmax}_x F_{in}(x, \hat{v}, \sigma^v, q)$$

$$F_{in}(x, \hat{v}, \sigma^v, q) = \log p_x(x \mid q) - \frac{1}{2\sigma^v}(\hat{v} - x)^2$$

$$g'_{in}(\hat{v}, \sigma^v, q) = \frac{1}{1 - \sigma^v \frac{\partial^2}{\partial x^2} \log[p_x(x \mid q)]}$$

$$g_{out}(y, \hat{p}, \sigma^z) = \frac{y - \hat{p}}{\sigma^w + \sigma^z}$$

$$g'_{out}(y, \hat{p}, \sigma^z) = -\frac{1}{\sigma^w + \sigma^z}$$

where, $\hat{v}$, $\sigma^v$, $\hat{p}$, $\sigma^z$ are input variables and $\sigma^w$ is a noise variance;

let a number of iterations $t_G=0$, a residual $\hat{s}(-1)=0$, a sparse vector estimated mean value $\hat{x}_{n_s}(t_G)>0$, and a sparse vector estimated variance $\sigma_{n_s}(t_G)>0$;

S33, letting $M=N_c N_f K$, where $N_c$ is a number of base stations, a is a number of code elements, $N_f$ is a number of subcarriers; for $m=1, 2, \ldots, M$, calculating estimated mean value $\hat{z}_m(t_G)$ and variance $\sigma_m^z(t_G)$ of a variable $z_m$:

$$\sigma_m^z(t_G) = \Sigma_{n_s} A_{m,n_s}^2 \sigma_{n_s}^x(t_G)$$

$$\hat{p}m(t_G) = \Sigma_{n_s} A_{m,n_s}(t_G) - \sigma_m^z(t) \hat{s}_m(t_G-1)$$

$$\hat{z}_m(t_G) = \Sigma_{n_s} A_{m,n_s} \hat{x}_{n_s}(t_G)$$

S34, for $m=1, 2, \ldots, M$, calculating a mean value $\hat{s}_m(t_G)$ and a variance $\sigma_m^s(t_G)$ of the residual:

$$\hat{s}_m(t_G) = g_{out}(t_G, y_m, \hat{p}_m(t_G), \sigma_m^z(t_G))$$

$$\sigma_m^s(t_G) = -g'_{out}(t_G, y_m, \hat{p}_m(t_G), \sigma_m^z(t_G))$$

where $y_m$ is the $m^{th}$ element of the receiving signal;

S35, for $n_s=1, 2, \ldots, N_s$, calculating observed mean value $\hat{v}_{n_s}(t_G)$ and variance $\sigma_{n_s}^v(t_G)$ of $\hat{x}_{n_s}(t_G)$:

$$\hat{v}_{n_s}(t_G) = \hat{x}_{n_s}(t_G) + \sigma_{n_s}^v(t_G) \Sigma_m A_{m,n_s} \hat{s}_m(t_G)$$

$$\sigma_{n_s}^v(t_G) = [\Sigma_{n_s} A_{m,n_s}^2 \sigma_{n_s}^s(t_G)]^{-1}$$

S36, for $n_s=1, 2, \ldots, N_s$, calculating observed mean value $\hat{x}_{n_s}(t_G+1)$ and variance $\sigma_{n_s}^x(t_G+1)$ of $x_{n_s}$:

$$\hat{x}_{n_s}(t_G+1) = g_{in}(t_G, \hat{v}_{n_s}(t_G), \sigma_{n_s}^v(t_G), q)$$

$$\sigma_{n_s}^x(t_G+1) = \sigma_{n_s}^v(t_G) g'_{in}(t_G, \hat{v}_{n_s}(t_G), \sigma_{n_s}^v(t_G), q)$$

S37, executing step S33 to step S36 repeatedly until a convergence condition $\Sigma_m |y_m - \hat{z}_m(t_G)| > \varepsilon_G$ is satisfied, where $\varepsilon_G$ is an error tolerance;

S38, taking a sparse variable $\hat{x}_{n_s}(t_G)$ as a coarse environmental sensing initial result of the environmental information x.

Further, the step S4 specifically incudes the following steps:

S41, selecting a predetermined region as a focused region of interest from the whole environment according to the coarse environmental sensing initial result and actual needs, wherein the target object is in the region of interest;

S42, in an ith iteration, detecting a background scatterer $\hat{x}_{back}^{(i)}(n_s)$ outside the region of interest as follows:

$$\hat{x}_{back}^{(i)}(n_s) = \begin{cases} 0, & \hat{x}^{(i)}(n_s) \leq \gamma_i \text{ or } \hat{x}^{(i)}(n_s) \text{ inside } ROI. \\ \hat{x}^{(i)}(n_s), & \hat{x}^{(i)}(n_s) \geq \gamma_i \end{cases}$$

where $\hat{x}^{(i)}(n_s)$ represents a result in the ith iteration, $y_i$ is a detection threshold of the background scatterer, and the detection threshold $\gamma_i$ shall decrease with the increase of the number of iterations;

S43, removing a background scattering part from the receiving signal to obtain a receiving signal $\hat{y}_{ROI}^{(i+1)}$ of the target object in a region of interest (ROI) of an $i+1^{st}$ iteration:

$$\hat{y}_{ROI}^{(i+1)} = (1-\alpha)\tilde{y} + \alpha(\hat{y}_{ROI}^{(i)} - A\hat{x}_{back}^{(i)})$$

where $\alpha$ is a weight variable, which is used to enhance the robustness of iterative algorithm, and the weight variable $\alpha$ should increase with the increase of the number of iterations.

Further, the step S5 specifically incudes the following steps:

S51, setting the prior probability of the environmental information in an iterative focused process, wherein in the $i^{th}$ iteration, it is assumed that the background scatterer obeys Bernoulli Gaussian distribution, and a prior probability formula $p(x_{back})$ is as follows:

$$p(x_{back}) = (1-\lambda)\delta(x_{back}) + \lambda \mathcal{N}(x_{back}; \theta_{back,i}, \sigma_{back})$$

where $\theta_{back,i}$ and $\sigma_{back}$ represent the mean value and the variance of the background environmental information distribution, respectively, $\lambda$ is a sparse coefficient, $N(\cdot)$ represents a standard normal distribution and $x_{back}$ represents the background scatterer.

The scatterer distribution in the selected ROI is a Gaussian distribution, and there is no sparsity.

$$p(x_{ROI}) = \mathcal{N}(x_{ROI}; \theta_{ROI}, \sigma_{ROI})$$

where $\theta_{ROI}$ and $\sigma_{ROI}$ represent the mean value and variance of ROI environmental information distribution, respectively;

S52, according to the prior probability formula obtained in step S51, setting the prior probability $p(x)$ of environmental information inside and outside the region of interest in the current $i+1^{st}$ iteration, $x=\{x_{ROI}, x_{back}\}$;

S53, initializing the approximate message passing algorithm parameters, and letting the input functions $g_{in}(\cdot)$, $g'_{in}(\cdot)$ and the output functions $g_{out}(\cdot)$, $g'_{out}(\cdot)$ be as follows:

$$g_{in}(\hat{v}, \sigma^v, q) = \mathrm{argmax}_x F_{in}(x, \hat{v}, \sigma^v, q)$$

$$F_{in}(x, \hat{v}, \sigma^v, q) = \log p_x(x \mid q) - \frac{1}{2\sigma^v}(\hat{v} - x)^2$$

$$g'_{in}(\hat{v}, \sigma^v, q) = \frac{1}{1 - \sigma^v \frac{\partial^2}{\partial x^2} \log[p_x(x \mid q)]}$$

$$g_{out}(y, \hat{p}, \sigma^z) = \frac{y - \hat{p}}{\sigma^w + \sigma^z}$$

$$g'_{out}(y, \hat{p}, \sigma^z) = -\frac{1}{\sigma^w + \sigma^z}$$

Let the number of iterations $t_G=0$, the residual $\hat{s}(-1)=0$, the sparse vector estimated mean value $\hat{x}_{n_s}(t_G)>0$ and the sparse vector estimate variance $\sigma_{n_s}^x(t_G)>0$;

S54, letting $M=N_c N_f K$, and for $m=1, 2, \ldots, M$, calculating estimated mean value $\hat{z}_m(t_G)$ and variance $\sigma_m^z(t_G)$ of $z_m$, which is specifically as follows:

$$\sigma_m^z(t_G) = \Sigma_{n_s} A_{m,n_s}^2 \sigma_{n_s}^x(t_G)$$

$$\hat{p}_m(t_G) = \Sigma_{n_s} A_{m,n_s} \hat{x}_{n_s}(t_G) - \sigma_m^z(t) \hat{s}_m(t_G - 1)$$

$$\hat{z}_m(t_G) = \Sigma_{n_s} A_{m,n_s} \hat{x}_{n_s}(t_G)$$

S55, for $m=1, 2, \ldots, M$, calculating a mean value $\hat{s}_m(t_G)$ and a variance $\sigma_m^s(t_G)$ of the residual, which is specifically as follows:

$$\hat{s}_m(t_G) = g_{out}(t_G, \hat{y}_{ROI,m}^{(i+1)}, \hat{p}_m(t_G), \sigma_m^z(t_G))$$

$$\sigma_m^s(t_G) = -g'_{out}(t_G, \hat{y}_{ROI,m}^{(i+1)}, \hat{p}_m(t_G), \sigma_m^z(t_G))$$

where $\hat{y}_{ROI,m}^{(i+1)}$ is a $m^{th}$ element of the receiving signal obtained in S43;

S56, for $n_s = 1, 2$, calculating observed mean value $\hat{v}_{n_s}(t_G)$ and variance $\sigma_{n_s}^v(t_G)$ of $\hat{x}_{n_s}(t_G)$ as follows:

$$\hat{v}_{n_s}(t_G) = \hat{x}_{n_s}(t_G) + \sigma_{n_s}^v(t_G) \Sigma_m A_{m,n_s} \hat{s}_m(t_G)$$

$$\sigma_{n_s}^v(t_G) = [\Sigma_m A_{m,n_s}^2 \sigma_{n_s}^s(t_G)]^{-1};$$

S57, for $n_s = 1, 2, \ldots, N_s$, calculating observed mean value $\hat{x}_{n_s}(t_G+1)$ and variance $\sigma_{n_s}^x(t_G+1)$ as follows:

$$\hat{x}_{n_s}(t_G+1) = g_{in}(t_G, \hat{v}_{n_s}(t_G), \sigma_{n_s}^v(t_G), q)$$

$$\sigma_{n_s}^x(t_G+1) = \sigma_{n_s}^v(t_G) g'_{in}(t_G, \hat{v}_{n_s}(t_G), \sigma_{n_s}^v(t_G), q)$$

S58, repeating steps S54 to S57 until the convergence condition $\Sigma_m |y_m - \hat{z}_m(t_G)| > \varepsilon_G$ is satisfied;

S59, taking the sparse variable $\hat{x}_{n_s}(t_G)$ estimated in the above steps as a final environment sensing result of the current iteration.

The present disclosure has the following beneficial effects: in the uplink wireless communication scene, the present disclosure provides a design method for integrated millimeter wave sensing and communication system by using the existing communication equipment, and fully utilizes different system resources to realize focused environmental sensing based on data sent by users; the iterative focused environmental sensing method provided by the present disclosure solves the problem of low accuracy of large-scale environmental sensing due to insufficient system resources; the present disclosure overcomes the defect that the traditional compressed sensing algorithm cannot focus on a specific range of environmental variables, while in the iterative process of the algorithm, the prior probability of environmental variables is estimated step by step according to the reconstruction result of compressed sensing in each step, thus realizing an iterative progressive compressed sensing sparse reconstruction for a specific target. On the basis of the same system resource overhead, the algorithm of the present disclosure significantly improves the sensing accuracy of a specific target and is superior to the existing algorithms.

DESCRIPTION OF EMBODIMENTS

In order to better understand the technical solution of the present disclosure, the embodiments of the present disclosure will be described in detail with reference to the attached drawings.

It should be clear that the described embodiments are only part of, not all of the embodiment of this present disclosure. Based on the embodiments in this present disclosure, all other embodiments obtained by those skilled in the art without creative work belong to the protection scope of this present disclosure.

Figure 1:
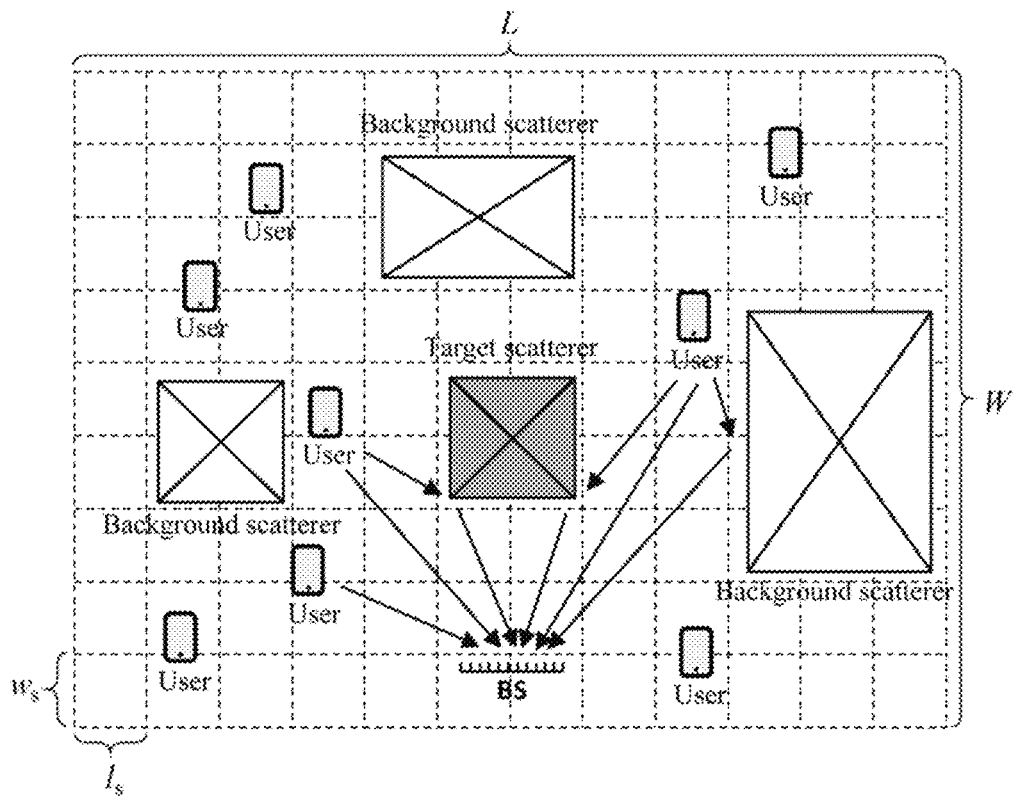
FIG. 1 is a schematic diagram of a two-dimensional focused millimeter wave environment sensing scenario provided by an exemplary embodiment.

A single-cell uplink communication system is taken into consideration, in which a multi-antenna BS serves multiple single-antenna users. In order to sense a specific target, all users send uplink communication signals to the base station at the same time. Due to a large amount of scattering in the environment, the transmitted signal of each user propagates through multiple paths. Therefore, the signal received by the base station contains abundant environmental scattering information in order that the base station can process the receiving signal to realize environmental sensing. As shown in FIG. 1, considering a simplified two-dimensional scene model, the analysis method of three-dimensional scenario can also be deduced. Gray target scatters are scatters to be imaged accurately, and the rest are background scatters that will not be considered.

The present disclosure provides an iterative focused millimeter wave integrated communication and sensing method, which includes the following steps:

S1, in any time slot, a base station receives pilot frequency sequence signals with a certain length sent by all active users in an environment to obtain receiving signals; the receiving signals are signals after the pilot frequency sequence signals are influenced by the environment.

S2, an environmental sensing problem of a specific target is converted into a compressed sensing reconstruction problem by using the receiving signals in the step S1 based on a multi-beam multi-carrier millimeter wave channel model.

In an embodiment, step S2 specifically includes the following steps:

S21, environmental information in the receiving signals in step S1 is discretized into pixels; each pixel represents environmental information in a small square with a surrounding size of $l_s \times w_s$, and if an environmental size of a whole range is $L_s \times W_s$, a total number of the pixels is $N_s = L/l_s \times W/w_s$; an interior of each pixel may be empty, or there may be scatters; a scattering coefficient $x_{n_s}$ is used to represent the scattering coefficient of a small cube where a $n_s^{th}$ point cloud is located; if an interior of the small cube is empty, then $x_{n_s} = 0$; therefore, the environmental information of a whole room can be expressed as $x = [x_1, x_2, \ldots, x_{N_s}]^T$.

S22, a multi-beam multi-carrier millimeter wave channel model is used, and at an $n_f^{th}$ subcarrier frequency, the receiving signals received by a receiving antenna of the base station are expressed as follows:

$$y_{n_f} = w_{n_f}(H_{n_f}^{s \to B} \text{diag}(\delta x) H_{n_f}^{u \to s} + H_{n_f}^{LOS}) s_{n_f} + n = w_{n_f}(H_{n_f}^{NLOS} + H_{n_f}^{LOS}) s_{n_f} + n$$

where $y_{n_f} \in \mathbb{C}^{N_c \times K}$ represents the receiving signals with a length of K code elements of RF links of $N_c$ base stations $w_{n_f} \in \mathbb{C}^{N_c \times N_R}$ is a beam forming vector of $N_R$ uniform linear array receiving antennas of the base stations, $\delta$ is a normalized coefficient of a scattering coefficient, which is selected according to a pixel size $l_s \times w_s$ and describes the physical relationship between an electromagnetic wave receiving region and a receiving power $s_{n_f} \in \mathbb{C}^{N_u \times K}$ represents pilot frequencies with a length of K code elements sent by $N_u$ users, n is noise; $H_{n_f}^{LOS}$ represents a free-space propagation channel from $N_u$ users to $N_R$ receiving antennas at an $n_f^{th}$ subcarrier frequency; and $H_{n_f}^{NLOS}$ is a NLOS channel on a nfth subcarrier.

$H_{n_f}^{LOS}$ is expressed as $$H_{n_f}^{LOS} = e_{n_f}^{LOS} G_{n_f}^{LOS}$$

where $e_{n_f}^{LOS}$ is a steering vector of $N_u$ users and $G_{n_f}^{LOS}$ is a channel gain from $N_u$ users to the base station;

$$e_{n_f}^{LOS}(n_R, n_u) = e^{j\frac{2\pi}{\lambda_{n_f}}(n_R-1)d\sin\theta_{n_u}^{LOS}} / \sqrt{N_R}$$

where j represents a complex code element, $n_R$ is a serial number of the receiving antenna, $\theta_{n_u}^{LOS}$ is an arrival angle of a $n_u^{th}$ user, and d is a uniform linear array antenna spacing deployed by the base station, $\lambda_{n_f}$ is a wavelength; $G_{n_f}^{LOS}$ is expressed as follows:

$$G_{n_f}^{LOS} = \text{diag}\left(\left[g_{n_f,1}^{LOS} e^{j\varphi_{n_f,1}^{LOS}}, \ldots, g_{n_f,N_u}^{LOS} e^{j\varphi_{n_f,N_u}^{LOS}}\right]\right)$$

where $g_{n_f,n_u}^{LOS}$ and $\varphi_{n_f,n_u}^{LOS}$ are a channel amplitude gain and a phase shift from the $n_u^{th}$ user to the base station, respectively.

At the $n_f^{th}$ subcarrier frequency, a free-space propagation channel $H_{n_f}^{u \to s}(n_s, n_u)$ from the $n_u^{th}$ user to a $n_s^{th}$ pixel is expressed as:

$$H_{n_f}^{u \to s}(n_s, n_u) = g_{n_f}^{u \to s}(n_s, n_u) e^{j\varphi_{n_f}^{u \to s}(n_s, n_u)}$$

where $g_{n_f}^{u \to s}(n_s, n_u)$ and $\varphi_{n_f}^{u \to s}(n_s, n_u)$ are a channel amplitude gain and a phase shift from $n_u^{th}$ user to the $n_s^{th}$ pixel, respectively.

At the $n_f^{th}$ subcarrier frequency, a free-space propagation channel $H_{n_f}^{s \to B} \in \mathbb{C}^{N_R \times N_s}$ from $N_s$ pixels to $N_R$ receiving antennas is expressed as:

$$H_{n_f}^{s \to B} = e_{n_f}^{s \to B} G_{n_f}^{s \to B}$$

where $e_{n_f}^{s \to B}$ is a steering vector of $N_s$ pixels and $G_{n_f}^{s \to B}$ is a channel gain from $N_s$ pixels to the base station.

$$e_{n_f}^{s \to B}(n_R, n_s) = e^{j\frac{2\pi}{\lambda_{n_f}}(n_R-1)d\sin\theta_{n_s}^{s \to B}} / \sqrt{N_R}$$

where $n_R$ is a receiving antenna number, $\theta_{n_s}^{s \to B}$ an arrival angle of the $n_s^{th}$ pixel, and $G_{n_f}^{s \to B}$ is expressed as follows:

$$G_{n_f}^{s \to B} = \text{diag}\left(\left[g_{n_f,1}^{s \to B} e^{j\varphi_{n_f,1}^{s \to B}}, \ldots, g_{n_f,N_s}^{s \to B} e^{j\varphi_{n_f,N_s}^{s \to B}}\right]\right)$$

where $g_{n_f,n_s}^{s \to B}$ and $\varphi_{n_f,n_s}^{s \to B}$ are a channel amplitude gain and a phase shift from the $n_s^{th}$ pixel to the base station, respectively.

S23, an estimation result of the environmental information is expressed as $\hat{x}$, which is expressed as follows:

$$\hat{x} = \arg\min_{x_{ROI}} \|x\|_0 \, s.t. \, \|y - w(H^{NLOS} + H^{LOS})s\|_2 \leq \varepsilon$$

where y is a receiving signal of all subcarriers, w is a beam forming vector of the uniform linear array receiving antenna of all subcarriers, $x_{ROI}$ is environmental information in a region of interest, $H^{NLOS}$ is a NLOS channel of all subcarriers, $H^{LOS}$ is a LOS channel of all subcarriers, s is a transmitted signal of the NLOS channel of all subcarriers, and $\varepsilon$ is a relaxation variable.

Since a free-space channel coefficient of a direct-view channel can be estimated by a numerical model, at the $n_f^{th}$ subcarrier frequency, part of the receiving signal $\hat{y}_{n_f}$ containing unknown environmental information is expressed as, $$\hat{y}_{n_f} = w_{n_f} H_{n_f}^{s \to B} \text{diag}(\delta x) H_{n_f}^{u \to s} s_{n_f} + n$$

by combining data of $N_f$ subcarriers, an iterative focused environmental sensing problem of a specific target is converted into a compressed sensing reconstruction problem equation as follows:

$$\begin{bmatrix} \hat{y}_1(:,1) \\ \vdots \\ \hat{y}_1(:,K) \\ \vdots \\ \hat{y}_{N_f}(:,1) \\ \vdots \\ \hat{y}_{N_f}(:,K) \end{bmatrix}_{N_c N_f K \times 1} =$$

$$\delta \begin{bmatrix} w_1 H_1^{s \to B} \text{diag}(H_1^{u \to s} s_1(:,1)) \\ \vdots \\ w_1 H_1^{s \to B} \text{diag}(H_1^{u \to s} s_1(:,K)) \\ \vdots \\ w_{N_f} H_{N_f}^{s \to B} \text{diag}(H_{N_f}^{u \to s} s_{N_f}(:,1)) \\ \vdots \\ w_{N_f} H_{N_f}^{s \to B} \text{diag}(H_{N_f}^{u \to s} s_{N_f}(:,K)) \end{bmatrix}_{N_c N_f K \times N_s} [x]_{N_s \times 1} + n \Rightarrow \hat{y} = Ax + n.$$

S3, the compressed sensing reconstruction problem in step S2 is solved based on an approximate message passing method to obtain a coarse initial result of environment sensing;

in an embodiment, step S3 specifically includes the following steps:

S31, firstly, an initial coarse environmental sensing prior probability is set, and the environmental information is set to be a Bernoulli-Gaussian distribution, wherein a probability density function $p_x(x|q)$ is expressed as:

$$p_x(x|q) = (1-\lambda)\delta(x) + \lambda N(x|\theta^x, \sigma^x)$$

where x represents an element in the environmental information x, all parameters are expressed as $q \triangleq [\lambda, \theta^x, \sigma^x]$, $\delta(\cdot)$ is an impulse function, $\lambda$ is a sparse coefficient; $\theta^x \in [0,1]$ and $\sigma^x$ are a mean value and a variance of environmental information distribution, respectively, and $N(\cdot)$ represents a standard normal distribution;

S32, approximate message passing algorithm parameters are initialized, and the input functions $g_{in}(\cdot)$, $g'_{in}(\cdot)$ and output functions $g_{out}(\cdot)$, $g'_{out}(\cdot)$ are as follows:

$$g_{in}(\hat{v}, \sigma^v, q) = \mathrm{argmax}_x F_{in}(x, \hat{v}, \sigma^v, q)$$

$$F_{in}(x, \hat{v}, \sigma^v, q) = \log p_x(x \mid q) - \frac{1}{2\sigma^v}(\hat{v} - x)^2$$

$$g'_{in}(\hat{v}, \sigma^v, q) = \frac{1}{1 - \sigma^v \frac{\partial^2}{\partial x^2} \log[p_x(x \mid q)]}$$

$$g_{out}(y, \hat{p}, \sigma^z) = \frac{y - \hat{p}}{\sigma^w + \sigma^z}$$

$$g'_{out}(y, \hat{p}, \sigma^z) = -\frac{1}{\sigma^w + \sigma^z}$$

where $\hat{v}$, $\sigma^v$, $\hat{p}$, $\sigma^z$ are input variables and $\sigma^w$ is a noise variance.

Let a number of iterations $t_G=0$, a residual $\hat{s}(-1)=0$, a sparse vector estimated mean value $\hat{x}_{n_s}(t_G) > 0$, and a sparse vector estimated variance $\sigma_{n_s}^x(t_G) > 0$.

S33, let $M = N_c N_f K$, where $N_c$ is a number of base stations, a is a number of code elements, $N_f$ is a number of subcarriers; for $m=1, 2, \ldots, M$, estimated mean value $\hat{z}_m(t_G)$ and variance $\sigma_m^z(t_G)$ of a variable $z_m$ are calculated:

$$\sigma_m^z(t_G) = \Sigma_{n_s} A_{m,n_s}^2 \sigma_{n_s}^x(t_G)$$

$$\hat{p}_m(t_G) = \Sigma_{n_s} A_{m,n_s} \hat{x}_{n_s}(t_G) - \sigma_m^z(t) \hat{s}_m(t_G - 1)$$

$$\hat{z}_m(t_G) = \Sigma_{n_s} A_{m,n_s} \hat{x}_{n_s}(t_G)$$

S34, for $m=1, 2, \ldots, M$, a mean value $\hat{s}_m(t_G)$ and a variance $\sigma_m^s(t_G)$ of the residual are calculated:

$$\hat{s}_m(t_G) = g_{out}(t_G, y_m, \hat{p}_m(t_G), \sigma_m^z(t_G))$$

$$\sigma_m^s(t_G) = -g'_{out}(t_G, y_m, \hat{p}_m(t_G), \sigma_m^z(t_G))$$

where $y_m$ is the $m^{th}$ element of the receiving signal;

S35, for $n_s = 1, 2, \ldots, N_s$, observed mean value $\hat{v}_{n_s}(t_G)$ and variance $\sigma_{n_s}^v(t_G)$ of $\hat{x}_{n_s}(t_G)$ are calculated:

$$\hat{v}_{n_s}(t_G) = \hat{x}_{n_s}(t_G) + \sigma_{n_s}^v(t_G) \Sigma_m A_{m,n_s} \hat{s}_m(t_G)$$

$$\sigma_{n_s}^v(t_G) = [\Sigma_{n_s} A_{m,n,n_s} \sigma_{n_s}^s(t_G)]^{-1}$$

S36, for $n_s = 1, 2, \ldots, N_s$, observed mean value $\hat{x}_{n_s}(t_G+1)$ and variance $\sigma_{n_s}^x(t_G+1)$ of $x_{n_s}$ are calculated:

$$\hat{x}_{n_s}(t_G+1) = g_{in}(t_G, \hat{v}_{n_s}(t_G), \sigma_{n_s}^v(t_G), q)$$

$$\sigma_{n_s}^x(t_G+1) = \sigma_{n_s}^v(t_G) g'_{in}(t_G, \hat{v}_{n_s}(t_G), \sigma_{n_s}^v(t_G), q)$$

S37, step S33 to step S36 are repeatedly executed until a convergence condition $\Sigma_m |y_m - \hat{z}_m(t_G)| > \varepsilon_G$ is satisfied, where $\varepsilon_G$ is an error tolerance;

S38, a sparse variable $\hat{x}_{n_s}(t_G)$ is taken as a coarse environmental sensing initial result of the environmental information $x$.

S4, a predetermined region is selected as a focused region of interest from the whole environment based on the coarse initial result of environmental sensing, and the target object in the region of interest is divided and determined according to a background determining method and the influence of background scatters outside the region of interest on the receiving signals is removed to obtain receiving signals corresponding to the target object;

In an embodiment, step S4 is specifically:

S41, a predetermined region as a focused region of interest from the whole environment according to the coarse environmental sensing initial result and actual needs; the target object is in the region of interest;

S42, in an ith iteration, a background scatterer $\hat{x}_{back}^{(i)}(n_s)$ outside the region of interest is detected as follows:

$$\hat{x}_{back}^{(i)}(n_s) = \begin{cases} 0, & \hat{x}^{(i)}(n_s) \leq \gamma_i \text{ or } \hat{x}^{(i)}(n_s) \text{ inside } ROI. \\ \hat{x}^{(i)}(n_s), & \hat{x}^{(i)}(n_s) \geq \gamma_i \end{cases}$$

where $\hat{x}^{(i)}(n_s)$ represents a result in the ith iteration, $y_i$ is a detection threshold of the background scatterer, and the detection threshold $y_i$ shall decrease with the increase of the number of iterations;

S43, a background scattering part from the receiving signal is removed to obtain a receiving signal $\hat{y}_{ROI}^{(i+1)}$ of the target object in ROI of an $i+1^{st}$ iteration:

$$\hat{y}_{ROI}^{(i+1)} = (1-\alpha)\hat{y} + \alpha(\hat{y}_{ROI}^{(i)} - Ax_{back}^{(i)})$$

where $\alpha$ is a weight variable, which is used to enhance the robustness of iterative algorithm, and the weight variable $\alpha$ should increase with the increase of the number of iterations.

S5, an environmental sensing result is calculated based on the receiving signals corresponding to the target object obtained in the step S4;

In an embodiment, step S5 specifically includes the following steps:

S51, the prior probability of the environmental information in an iterative focused process is set; in the $i^{th}$ iteration, it is assumed that the background scatterer obeys Bernoulli Gaussian distribution, and a prior probability formula $p(x_{back})$ is as follows:

$$p(x_{back}) = (1-\lambda)\delta(x_{back}) + \lambda \mathcal{N}(x_{back}; \theta_{back,i}, \sigma_{back})$$

where $\theta_{back,i}$ and $\sigma_{back}$ represent the mean value and the variance of the background environmental information distribution, respectively, $\lambda$ is a sparse coefficient, $N(\cdot)$ represents a standard normal distribution and $x_{back}$ represents the background scatterer.

The scatterer distribution in the selected ROI is a Gaussian distribution, and there is no sparsity.

$$p(x_{ROI}) = \mathcal{N}(x_{ROI}; \theta_{ROI}, \sigma_{ROI})$$

where $\theta_{ROI}$ and $\sigma_{ROI}$ represent the mean value and variance of ROI environmental information distribution, respectively;

S52, according to the prior probability formula obtained in step S51, the prior probability $p(x)$ of environmental information inside and outside the region of interest in the current $i+1^{st}$ iteration is set, $x = \{x_{ROI}, x_{back}\}$.

S53, the approximate message passing algorithm parameters are initialized, and let the input functions $g_{in}(\cdot)$, $g'_{in}(\cdot)$ and the output functions $g_{out}(\cdot)$, $g'_{in}(\cdot)$ be as follows:

$$g_{in}(\hat{v}, \sigma^v, q) = \mathrm{argmax}_x F_{in}(x, \hat{v}, \sigma^v, q)$$

$$F_{in}(x, \hat{v}, \sigma^v, q) = \log p_x(x \mid q) - \frac{1}{2\sigma^v}(\hat{v} - x)^2$$

$$g'_{in}(\hat{v}, \sigma^v, q) = \frac{1}{1 - \sigma^v \frac{\partial^2}{\partial x^2} \log[p_x(x \mid q)]}$$

$$g_{out}(y, \hat{p}, \sigma^z) = \frac{y - \hat{p}}{\sigma^w + \sigma^z}$$

$$g'_{out}(y, \hat{p}, \sigma^z) = -\frac{1}{\sigma^w + \sigma^z}$$

Let the number of iterations $t_G = 0$, the residual $\hat{S}(-1) = 0$, the sparse vector estimated mean value $\hat{x}_{n_s}(t_G) > 0$ and the sparse vector estimate variance $\sigma_{n_s}^x(t_G) > 0$;

S54, let $M=N_c n_f K$, and for $m=1, 2, \ldots, M$, estimated mean value $\hat{z}_m(t_G)$ and variance $\sigma_m^z(t_G)$ of $z_m$ are calculated, which is specifically as follows:

$$\sigma_m^z(t_G)=\Sigma_{n_s} A_{m,n_s}^2 \sigma_{n_s}^x(t_G)$$

$$\hat{p}_m(t_G)=\Sigma_{n_s} A_{m,n_s} \hat{x}_{n_s}(t_G) - \sigma_m^z(t) \hat{s}_m(t_G-1)$$

$$\hat{z}_m(t_G)=\Sigma_{n_s} A_{m,n_s} \hat{x}_{n_s}(t_G)$$

S55, for $m=1, 2, \ldots, M$, calculating a mean value $\hat{s}_m(t_G)$ and a variance $\sigma_m^s(t_G)$ of the residual, which is specifically as follows:

$$\hat{s}_m(t_G)=g_{out}(t_G, \hat{y}_{ROI,m}^{(i+1)}, \hat{p}_m(t_G), \sigma_m^z(t_G))$$

$$\sigma_m^s(t_G)=-g'_{out}(t_G, \hat{y}_{ROI,m}^{(i+1)}, \hat{p}_m(t_G), \sigma_m^z(t_G))$$

where $\hat{y}_{ROI,m}^{(i+1)}$ is a $m^{th}$ element of the receiving signal obtained in S43;

S56, for $n_s=1,2, N_s$, observed mean value $\hat{v}_{n_s}(t_G)$ and variance $\sigma_{n_s}^v(t_G)$ of $\hat{x}_{n_s}(t_G)$ as follows:

$$\hat{v}_{n_s}(t_G)=\hat{x}_{n_s}(t_G)+\sigma_{n_s}(t_G)\Sigma_m A_{m,n_s} \hat{s}_m(t_G)$$

$$\sigma_{n_s}^v(t_G)=[\Sigma_{n_s} A_{m,n_s}^2 \sigma_{n_s}^s(t_G)]^{-1}.$$

S57, for $n_s=1, 2, \ldots, N_s$, observed mean value $\hat{x}_{n_s}(t_G+1)$ and variance $\sigma_{n_s}^x(t_G+1)$ as follows:

$$\hat{x}_{n_s}(t_G+1)=g_{in}(t_G, \hat{v}_{n_s}(t_G), \sigma_{n_s}^v(t_G), q)$$

$$\sigma_{n_s}^x(t_G+1)=\sigma_{n_s}^v(t_G)g'_{in}(t_G, \hat{v}_{n_s}(t_G), \sigma_{n_s}^v(t_G), q)$$

S58, steps S54 to S57 are repeated until the convergence condition $\Sigma_m |y_m - \hat{z}_m(t_G)| > \varepsilon_G$ is satisfied;

S59, the sparse variable $\hat{x}_{n_s}(t_G)$ estimated in the above steps is taken as a final environment sensing result of the current iteration.

Figure 2:
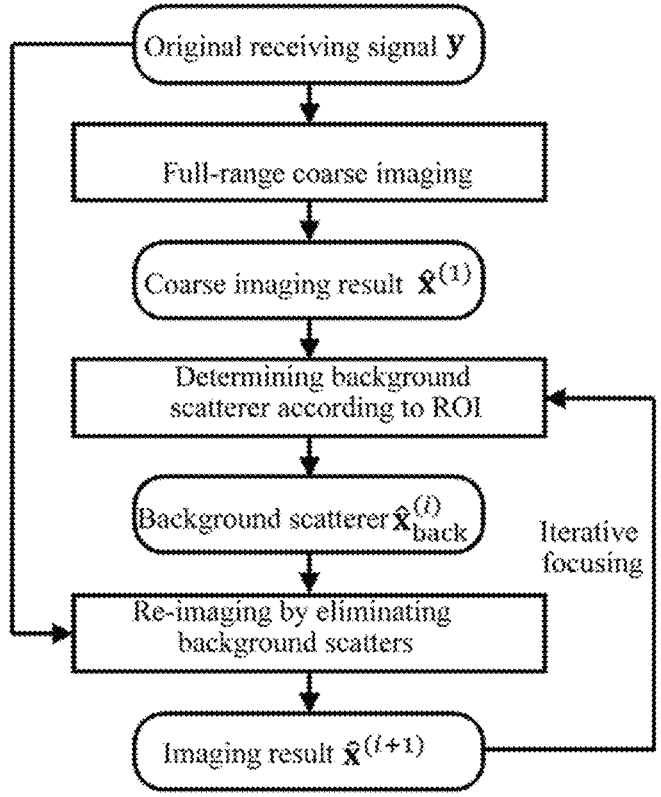
FIG. 2 is a flowchart of an iterative algorithm provided by an exemplary embodiment.

S6, step S4 and step S5 are repeated in sequence until the algorithm convergence, the iterative flow chart is shown in FIG. 2, and the final environment sensing result is obtained.

Figure 3:
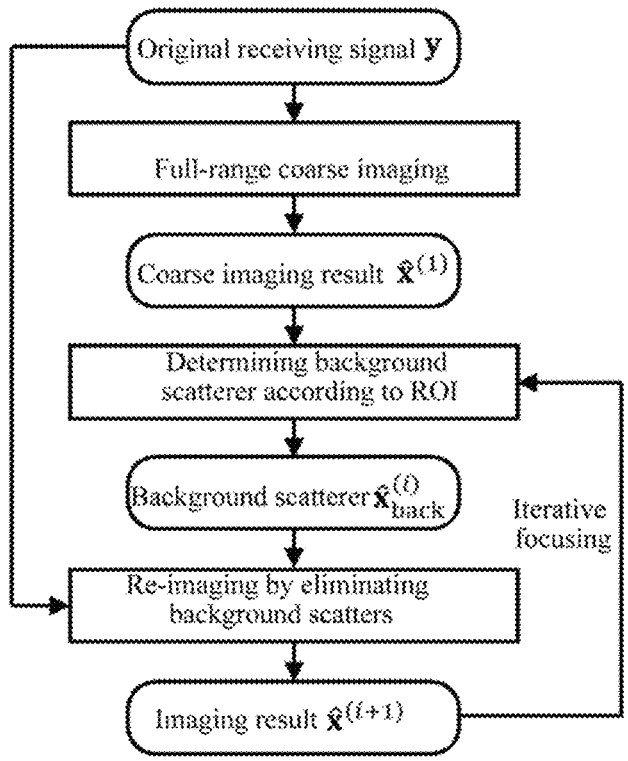
FIG. 3 is a diagram showing the relationship between the number of users and the environmental sensing accuracy MSE when comparing the present disclosure with other compressed sensing reconstruction algorithms provided by an exemplary embodiment.
Figure 4:
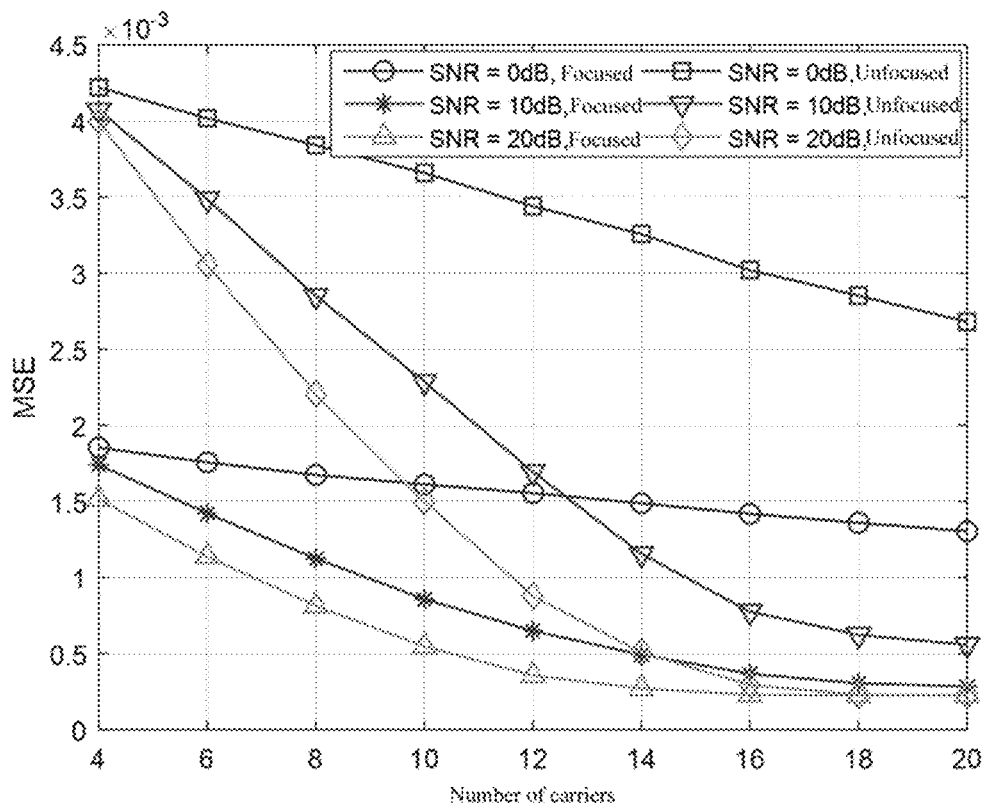
FIG. 4 is a diagram showing the relationship between the number of subcarriers and the environmental sensing accuracy MSE when comparing the present disclosure with other compressed sensing reconstruction algorithms provided by an exemplary embodiment.

As can be seen from computer simulation: as shown in FIGS. 3 and 4, the imaging effect between the focused method of the present disclosure and the large-scale imaging algorithm is compared. Compared with large-scale imaging, the algorithm of the present disclosure significantly improves the imaging accuracy of objects in ROI. FIG. 3 shows that with the increase of the number of users, the environmental sensing effect of the method of the present disclosure is gradually improved and superior to the existing algorithms. FIG. 4 shows that with the increase of the number of subcarriers, the environmental sensing effect of the method of the present disclosure is gradually improved and superior to the existing algorithms.

In the uplink wireless communication scenario, the design method for integrated millimeter wave sensing and communication system by using the existing communication equipment fully utilizes different system resources to realize focused environmental sensing based on the data sent by users, converts the environmental sensing problem into a compressed sensing reconstruction problem, and then realizes the initial coarse sensing of the environment based on an approximate message passing algorithm. According to a background determining method, in the present disclosure, the target object is divided and determined, and the influence of the background scatterer on the receiving signal is removed, and finally, the background scatterer is repeatedly removed, so as to obtain a more accurate focused sensing result of the target object. Compared with the existing environmental sensing reconstruction algorithms, the iterative focused environmental sensing method provided by the present disclosure solves the problem of low precision of large-scale environmental sensing due to insufficient system resources, improves the defect that the traditional compressed sensing algorithm cannot focus on a specific range of environmental variables, thereby providing an efficient environment sensing method for the future design of integrated sensing and communication system. In the iterative process of the algorithm, according to the results of each step of compressed sensing reconstruction, the prior probability of environmental variables is estimated step by step, and an iterative progressive compressed sensing sparse reconstruction is realized for a specific target. On the basis of the same system resource overhead, the algorithm of the present disclosure significantly improves the sensing accuracy of a specific target and is superior to the existing algorithms.

The above is only preferred embodiments of one or more embodiments of this specification, and is not intended to limit one or more embodiments of this specification. Any modification, equivalent substitution, improvement and the like made within the spirit and principle of one or more embodiments of this description shall be included in the scope of protection of one or more embodiments of this description.

What is claimed is:

1. An iterative focused millimeter wave integrated communication and sensing method, which is applied to uplink wireless communication, comprising the following steps:

S1, in any time slot, receiving, by a base station, pilot frequency sequence signals with a certain length sent by all active users in an environment to obtain receiving signals, wherein the receiving signals are signals after the pilot frequency sequence signals are influenced by environment;

S2, converting an environmental sensing problem of a specific target into a compressed sensing reconstruction problem using the receiving signals in the step S1 based on a multi-beam multi-carrier millimeter wave channel model;

S3, solving the compressed sensing reconstruction problem in the step S2 based on an approximate message passing method to obtain a coarse environmental sensing initial result;

S4, selecting a predetermined region as a region of interest from whole environment based on the coarse environmental sensing initial result, and dividing and determining a target object in the region of interest according to a background determining method and removing influence of background scatters outside the region of interest on the receiving signals to obtain receiving signals corresponding to the target object;

S5, calculating an environmental sensing result based on the receiving signals corresponding to the target object obtained in the step S4; and S6, repeating the steps S4 and S5 in sequence until an algorithm convergence, to obtain a final environment sensing result.

2. The method according to claim 1, wherein the step S2 comprises the following sub-steps:

S21, discretizing environmental information in the receiving signals in the step S1 into pixels, wherein each of the pixels represents environmental information in a small square with a surrounding size of $l_s \times w_s$, letting an environmental size of a whole range is $L_s \times W_s$, a total number of the pixels being $N_s = L/l_s \times W/w_s$; each of the pixels is empty, or has scatters inside, wherein a scattering coefficient $x_{n_s}$ is used to represent a scattering coefficient of a small cube where a $n_s^{th}$ point cloud is located, when an interior of the small cube is empty, $x_{n_s}=0$, and environmental information of a whole room is expressed as $x=[x_1, x_2, \ldots, x_{N_s}]^T$;

S22, constructing the multi-beam multi-carrier millimeter wave channel model, wherein at an $n_f^{th}$ subcarrier frequency, the receiving signals received by a receiving antenna of the base station are expressed as follows:

$$y_{n_f} = w_{n_f}(H_{n_f}^{s \to B} \text{diag}(\delta x) H_{n_f}^{u \to s} + H_{n_f}^{LOS}) s_{n_f} + n = w_{n_f}(H_{n_f}^{NLOS} + H_{n_f}^{LOS}) s_{n_f} + n$$

where $y_{n_f} \in \mathbb{C}^{N_c \times K}$ represents the receiving signals with a length of K code elements of RF links of $N_c$ base stations, $w_{n_f} \in \mathbb{C}^{N_c \times N_R}$ represents a beam forming vector of $N_R$ uniform linear array receiving antennas of the base stations, $\delta$ represents a normalized coefficient of a scattering coefficient, selected according to a pixel size $l_s \times w_s$, wherein a normalized coefficient defines a physical relationship between an electromagnetic wave receiving region and a receiving power, $s_{n_f} \in \mathbb{C}^{N_u \times K}$ represents pilot frequencies with a length of K code elements sent by $N_u$ users, n represents noise; $H_{n_f}^{LOS}$ represents a free-space propagation channel from $N_u$ users to $N_R$ receiving antennas at an $n_f^{th}$ subcarrier frequency; and $H_{n_f}^{NLOS}$ represents a Non-Line-of-Sight (NLOS) channel on an $n_f^{th}$ subcarrier;

wherein $H_{n_f}^{NLOS}$ is expressed as follows:

$$H_{n_f}^{LOS} = e_{n_f}^{LOS} G_{n_f}^{LOS}$$

where $e_{n_f}^{LOS}$ represents a steering vector of $N_u$ users and $G_{n_f}^{LOS}$ represents a channel gain from $N_u$ users to the base station;

wherein $e_{n_f}^{LOS}$ is expressed as follows:

$$e_{n_f}^{LOS}(n_R, n_u) = e^{j\frac{2\pi}{\lambda_{n_f}}(n_R-1)d\sin\theta_{n_u}^{LOS}} / \sqrt{N_R}$$

where j represents a complex code element, $n_R$ represents a serial number of the receiving antenna, $\theta_{n_u}^{LOS}$ represents an arrival angle of an $n_u^{th}$ user, and d represents a uniform linear array antenna spacing deployed by the base station, and $\lambda_{n_f}$ represents a wavelength;

wherein $G_{n_f}^{LOS}$ is expressed as follows:

$$G_{n_f}^{LOS} = \text{diag}\left(\left[g_{n_f,1}^{LOS} e^{j\varphi_{n_f,1}^{LOS}}, \ldots, g_{n_f,N_u}^{LOS} e^{j\varphi_{n_f,N_u}^{LOS}}\right]\right)$$

where $g_{n_f,n_u}^{LOS}$ and $\varphi_{n_f,n_u}^{LOS}$ represent a channel amplitude gain and a phase shift from the $n_u^{th}$ user to the base station, respectively;

wherein at the $n_f^{th}$ subcarrier frequency, a free-space propagation channel $H_{n_f}^{u \to s}(n_s, n_u)$ from the $n_u^{th}$ user to an $n_s^{th}$ pixel is expressed as:

$$H_{n_f}^{u \to s}(n_s, n_u) = g_{n_f}^{u \to s}(n_s, n_u) e^{j\varphi_{n_f}^{u \to s}(n_s, n_u)}$$

where $g_{n_f}^{u \to s}(n_s, n_u)$ and $\varphi_{n_f}^{u \to s}(n_s, n_u)$ are a channel amplitude gain and a phase shift from $n_u^{th}$ user to the $n_s^{th}$ pixel, respectively;

wherein at the $n_f^{th}$ subcarrier frequency, a free-space propagation channel $H_{n_f}^{s \to B} \in \mathbb{C}^{N_R \times N_s}$ from $N_s$ pixels to $N_R$ receiving antennas is expressed as:

$$H_{n_f}^{s \to B} = e_{n_f}^{s \to B} G_{n_f}^{s \to B}$$

where $e_{n_f}^{s \to B}$ represents a steering vector of $N_s$ pixels and $G_{n_f}^{s \to B}$ represents a channel gain from $N_s$ pixels to the base station;

$$e_{n_f}^{s \to B}(n_R, n_s) = e^{j\frac{2\pi}{\lambda_{n_f}}(n_R-1)d\sin\theta_{n_s}^{s \to B}} / \sqrt{N_R}$$

where $n_R$ represents a receiving antenna number, $\theta_{n_s}^{s \to B}$ represents an arrival angle of the $n_s^{th}$ pixel, and wherein $G_{n_f}^{s \to B}$ is expressed as follows:

$$G_{n_f}^{s \to B} = \text{diag}\left(\left[g_{n_f,1}^{s \to B} e^{j\varphi_{n_f,1}^{s \to B}}, \ldots, g_{n_f,N_s}^{s \to B} e^{j\varphi_{n_f,N_s}^{s \to B}}\right]\right)$$

where $g_{n_f,n_s}^{s \to B}$ and $\varphi_{n_f,n_s}^{s \to B}$ represent a channel amplitude gain and a phase shift from the $n_s^{th}$ pixel to the base station, respectively; and S23, expressing an estimation result of environmental information as $\hat{x}$, wherein $\hat{x}$ is expressed as follows:

$$\hat{x} = \text{argmin}_{x_{ROI}} \|X\|_0 \, s.t. \|y - w(H^{NLOS} + H^{LOS})s\|_2 \leq \varepsilon$$

where y is a receiving signal of all subcarriers, w represents a beam forming vector of the uniform linear array receiving antenna of all subcarriers, $x_{ROI}$ represents environmental information in the region of interest, $H_{NLOS}$ represents a NLOS channel of all subcarriers, $H_{LOS}$ represents a LOS channel of all subcarriers, s represents a transmitted signal of the NLOS channel of all subcarriers, and $\varepsilon$ represents a relaxation variable;

expressing, at the $n_f^{th}$ subcarrier frequency, part of the receiving signal $\tilde{y}_{n_f}$ containing unknown environmental information as follows:

$$\tilde{y}_{n_f} = w_{n_f} H_{n_f}^{s \to B} \text{diag}(\delta x) H_{n_f}^{u \to s} s_{n_f} + n$$

wherein a free-space channel coefficient of a direct-view channel is estimated by a numerical model, and converting, by combining data of $N_f$ subcarriers, an iterative focused environmental sensing problem of a specific target into a compressed sensing reconstruction problem equation as follows:

$$\begin{bmatrix} \tilde{y}_1(:,1) \\ \vdots \\ \tilde{y}_1(:,K) \\ \vdots \\ \tilde{y}_{N_f}(:,1) \\ \vdots \\ \tilde{y}_{N_f}(:,K) \end{bmatrix}_{N_c N_f K \times 1} = \delta \begin{bmatrix} w_1 H_1^{s \to B} \text{diag}(H_1^{u \to s} s_1(:,1)) \\ \vdots \\ w_1 H_1^{s \to B} \text{diag}(H_1^{u \to s} s_1(:,K)) \\ \vdots \\ w_{N_f} H_{N_f}^{s \to B} \text{diag}(H_{N_f}^{u \to s} s_{N_f}(:,1)) \\ \vdots \\ w_{N_f} H_{N_f}^{s \to B} \text{diag}(H_{N_f}^{u \to s} s_{N_f}(:,K)) \end{bmatrix}_{N_c N_f K \times N_s} [x]_{N_s \times 1} + n \Rightarrow \tilde{y} = Ax + n.$$

3. The method according to claim 2, wherein the step S3 comprises the following steps:

S31, firstly setting an initial coarse environmental sensing prior probability, and letting the environmental information be a Bernoulli-Gaussian distribution, wherein a probability density function $p_x(x|q)$ is expressed as:

$$p_x(x|q) = (1-\lambda)\delta(x) + \lambda N(x|\theta^x, \sigma^x)$$

where x represents an element in environmental information x, all parameters are expressed as $q \triangleq [\lambda, \theta^x, \sigma^x]$, $\delta(\cdot)$ represents an impulse function, $\lambda$ represents a sparse coefficient; $\theta^x \in [0,1]$ and $\sigma^x$ represent a mean value and a variance of environmental information distribution, respectively, and $N(\cdot)$ represents a standard normal distribution;

S32, initializing approximate message passing algorithm parameters, and letting input functions $g_{in}(\cdot)$, $g'_{in}(\cdot)$ and output functions $g_{out}(\cdot)$, $g'_{out}(\cdot)$ be as follows, respectively $$g_{in}(\hat{v}, \sigma^v, q) = \arg\max_x F_{in}(x, \hat{v}, \sigma^v, q)$$

$$F_{in}(x, \hat{v}, \sigma^v, q) = \log p_x(x|q) - \frac{1}{2\sigma^v}(\hat{v}-x)^2$$

$$g'_{in}(\hat{v}, \sigma^v, q) = \frac{1}{1 - \sigma^v \frac{\partial^2}{\partial x^2} \log[p_x(x|q)]}$$

$$g_{out}(y, \hat{p}, \sigma^z) = \frac{y-\hat{p}}{\sigma^w + \sigma^z}$$

$$g'_{out}(y, \hat{p}, \sigma^z) = -\frac{1}{\sigma^w + \sigma^z}$$

where $\hat{v}$, $\sigma^v$, $\hat{p}$, $\sigma^z$ are input variables and $\sigma^w$ represents a noise variance; and setting a number of iterations $t_G = 0$, a residual $\hat{s}(-1) = 0$, a sparse vector estimated mean value $\hat{x}_{n_s}(t_G) > 0$, and a sparse vector estimated variance $\sigma_{n_s}^x(t_G) > 0$;

S33, letting $M = N_c N_f K$, where $N_c$ represents a number of base stations, K represents a number of code elements, $N_f$ represents a number of subcarriers; for m=1, 2, ..., M, calculating estimated mean value $\hat{z}_m(t_G)$ and variance $\sigma_m^z(t_G)$ of a variable $z_m$:

$$\sigma_m^z(t_G) = \sum_{n_s} A_{m,n_s}^2 \sigma_{n_s}^x(t_G)$$

$$\hat{p}_m(t_G) = \sum_{n_s} A_{m,n_s} \hat{x}_{n_s}(t_G) - \sigma_m^z(t)\hat{s}_m(t_G - 1)$$

$$\hat{z}_m(t_G) = \sum_{n_s} A_{m,n_s} \hat{x}_{n_s}(t_G)$$

S34, for m=1, 2, ..., M, calculating a mean value $\hat{s}_m(t_G)$ and a variance $\sigma_m^s(t_G)$ of the residual as follows:

$$\hat{s}_m(t_G) = g_{out}(t_G, y_m, \hat{p}_m(t_G), \sigma_m^z(t_G))$$

$$\sigma_m^s(t_G) = -g'_{out}(t_G, y_m, \hat{p}_m(t_G), \sigma_m^z(t_G))$$

where $y_m$ represents an $m^{th}$ element of the receiving signal;

S35, for $n_s = 1, 2, ..., N_s$, calculating observed mean value $\hat{v}n_s(t_G)$ and variance $\sigma_{n_s}^v(t_G)$ of $\hat{x}_{n_s}(t_G)$ as follows:

$$\hat{v}_{n_s}(t_G) = \hat{x}_{n_s}(t_G) + \sigma_{n_s}^v(t_G) \sum_m A_{m,n_s} \hat{s}_m(t_G)$$

$$\sigma_{n_s}^v(t_G) = \left[\sum_{n_s} A_{m,n_s}^2 \sigma_{n_s}^s(t_G)\right]^{-1}$$

S36, for $n_s = 1, 2, ..., N_s$, calculating observed mean value $\hat{x}_{n_s}(t_G+1)$ and variance $\sigma_{n_s}^x(t_G+1)$ of $x_{n_s}$:

$$\hat{x}_{n_s}(t_G+1) = g_{in}(t_G, \hat{v}_{n_s}(t_G), \sigma_{n_s}^v(t_G), q)$$

$$\sigma_{n_s}^x(t_G+1) = \sigma_{n_s}^v(t_G) g'_{in}(t_G, \hat{v}_{n_s}(t_G), \sigma_{n_s}^v(t_G), q)$$

S37, executing steps S33 to S36 repeatedly until a convergence condition $\Sigma_m |y_m - \hat{z}_m(t_G)| > \varepsilon_G$ is satisfied, where $\varepsilon_G$ represents an error tolerance; and S38, taking a sparse variable $\hat{x}_{n_s}(t_G)$ as the coarse environmental sensing initial result of the environmental information x.

4. The method according to claim 3, wherein the step S4 comprises the following steps:

S41, selecting a predetermined region as the region of interest from the whole environment according to the coarse environmental sensing initial result and actual needs, wherein the target object is in the region of interest;

S42, in an $i^{th}$ iteration, detecting a background scatterer $\hat{x}_{back}^{(i)}(n_s)$ outside the region of interest as follows:

$$\hat{x}_{back}^{(i)}(n_s) = \begin{cases} 0, & \hat{x}^{(i)}(n_s) \leq \gamma_i \text{ or } \hat{x}^{(i)}(n_s) \text{ inside } ROI. \\ \hat{x}^{(i)}(n_s), & \hat{x}^{(i)}(n_s) \geq \gamma_i \end{cases}$$

where $\hat{x}^{(i)}(n_s)$ represents a result in the $i^{th}$ iteration, $\gamma_i$ represents a detection threshold of the background scatterer, wherein the detection threshold $\gamma_i$ decreases with increase of the number of iterations; and S43, removing a background scattering part from the receiving signal to obtain a receiving signal $\hat{y}_{ROI}^{(i+1)}$ of the target object in a focused region of interest (ROI) of an $(i+1)^{st}$ iteration:

$$\hat{y}_{ROI}^{(i+1)} = (1-\alpha)\tilde{y} + \alpha(\hat{y}_{ROI}^{(i)} - A\hat{x}_{back}^{(i)})$$

where $\alpha$ represents a weight variable, for enhancing robustness of iterative algorithm, and the weight variable $\alpha$ increases with the increase of the number of iterations.

5. The method according to claim 1, wherein the step S5 comprises the following steps:

S51, setting the prior probability of the environmental information in an iterative focused process, wherein in the $i^{th}$ iteration, assuming that the background scatterer obeys Bernoulli Gaussian distribution, and a prior probability formula $p(x_{back})$ is expressed as follows:

$$p(x_{back}) = (1-\lambda)\delta(x_{back}) + \lambda \mathcal{N}(x_{back}; \theta_{back,i}, \sigma_{back})$$

where $\theta_{back,i}$ and $\sigma_{back}$ represent a mean value and a variance of a background environmental information distribution, respectively, $\lambda$ represents a sparse coefficient, $N(\cdot)$ represents a standard normal distribution, and $x_{back}$ represents the background scatterer;

wherein scatterer distribution in the selected ROI is a Gaussian distribution, with no sparsity:

$$p(x_{ROI}) = \mathcal{N}(x_{ROI}; \theta_{ROI}, \sigma_{ROI})$$

where $\theta_{ROI}$ and $\sigma_{ROI}$ represent a mean value and a variance of ROI environmental information distribution, respectively;

S52, setting, according to the prior probability formula obtained in step S51, the prior probability p(x) of environmental information inside and outside the region of interest in an $(i+1)^{st}$ iteration, wherein $x=\{x_{ROI}, x_{back}\}$;

S53, initializing approximate message passing algorithm parameters, and letting input functions $g_{in}(\cdot)$, $g'_{in}(\cdot)$ and output functions $g_{out}(\cdot)$, $g'_{out}(\cdot)$ be as follows:

$$g_{in}(\hat{v}, \sigma^v, q) = \arg\max_x F_{in}(x, \hat{v}, \sigma^v, q)$$

$$F_{in}(x, \hat{v}, \sigma^v, q) = \log p_x(x \mid q) - \frac{1}{2\sigma^v}(\hat{v}-x)^2$$

$$g'_{in}(\hat{v}, \sigma^v, q) = \frac{1}{1 - \sigma^v \frac{\partial^2}{\partial x^2}\log[p_x(x \mid q)]}$$

$$g_{out}(y, \hat{p}, \sigma^z) = \frac{y - \hat{p}}{\sigma^w + \sigma^z}$$

$$g'_{out}(y, \hat{p}, \sigma^z) = -\frac{1}{\sigma^w + \sigma^z}$$

letting a number of iterations $t_G=0$, a residual $\hat{s}(-1)=0$, a sparse vector estimated mean value $\hat{x}_{n_s}(t_G)>0$ and a sparse vector estimate variance $\sigma_{n_s}^x(t_G)>0$;

S54, letting $M=N_cN_fK$, and for m=1, 2, ..., M, calculating an estimated mean value $\hat{z}_m(t_G)$ and a variance $\sigma_m^z(t_G)$ of $z_m$ as follows:

$$\sigma_m^z(t_G) = \sum_{n_s} A_{m,n_s}^2 \sigma_{n_s}^x(t_G)$$

$$\hat{p}_m(t_G) = \sum_{n_s} A_{m,n_s}\hat{x}_{n_s}(t_G) - \sigma_m^z(t)\hat{s}_m(t_G-1)$$

$$\hat{z}_m(t_G) = \sum_{n_s} A_{m,n_s}\hat{x}_{n_s}(t_G)$$

S55, for m=1, 2, ..., M, calculating a mean value $\hat{s}_m(t_G)$ and a variance $\sigma_m^s(t_G)$ of the residual as follows:

$$\hat{s}_m(t_G)=g_{out}(t_G,\hat{y}_{ROI,m}^{(i+1)},\hat{p}_m(t_G),\sigma_m^z(t_G))$$

$$\sigma_m^s(t_G)=-g'_{out}(t_G,\hat{y}_{ROI,m}^{(i+1)},\hat{p}_m(t_G),\sigma_m^z(t_G))$$

where $\hat{y}_{ROI,m}^{(i+1)}$ is an $m^{th}$ element of the receiving signal obtained in S43;

S56, for $n_s=1, 2, \ldots, N_s$, calculating observed a mean value $\hat{v}_{n_s}(t_G)$ and a variance $\sigma_{n_s}^v(t_G)$ of $\hat{x}_{n_s}(t_G)$ as follows:

$$\hat{v}_{n_s}(t_G) = \hat{x}_{n_s}(t_G) + \sigma_{n_s}^v(t_G)\sum_m A_{m,n_s}\hat{s}_m(t_G)$$

$$\sigma_{n_s}^v(t_G) = \left[\sum_{n_s} A_{m,n_s}^2 \sigma_{n_s}^s(t_G)\right]^{-1};$$

S57, for $n_s=1, 2, \ldots, N_s$, calculating observed mean value $\hat{x}_{n_s}(t_G+1)$ and variance $\sigma_{n_s}^x(t_G+1)$ as follows:

$$\hat{x}_{n_s}(t_G+1)=g_{in}(t_G,\hat{v}_{n_s}(t_G),\sigma_{n_s}^v(t_G),q)$$

$$\sigma_{n_s}^x(t_G+1)=\sigma_{n_s}^v(t_G)g'_{in}(t_G,\hat{v}_{n_s}(t_G),\sigma_{n_s}^v(t_G),q)$$

S58, repeating steps S54 to S57 until the convergence condition $\Sigma_m|y_m - \hat{z}_m(t_G)|>\varepsilon_G$ is satisfied; and S59, taking a sparse variable $\hat{x}_{n_s}(t_G)$ estimated in the above steps S51 to S58 as a final environment sensing result of a current iteration.

\* \* \* \* \*